(12) United States Patent
Adams et al.

(10) Patent No.: US 8,302,070 B2
(45) Date of Patent: Oct. 30, 2012

(54) OUTPUT STYLING IN AN IDE CONSOLE

(75) Inventors: Samuel S. Adams, Raleigh, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 11/456,936

(22) Filed: Jul. 12, 2006

(65) Prior Publication Data
US 2008/0016488 A1    Jan. 17, 2008

(51) Int. Cl.
G06F 9/44    (2006.01)

(52) U.S. Cl. ........ 717/105; 717/106; 717/107; 717/109; 717/113

(58) Field of Classification Search ......................... None
See application file for complete search history.

(56) References Cited

U.S. PATENT DOCUMENTS

| | | | |
|---|---|---|---|
| 6,223,191 B1 | 4/2001 | Truelson | |
| 6,613,098 B1 | 9/2003 | Sorge et al. | |
| 6,901,581 B1 | 5/2005 | Schneider | |
| 7,020,839 B1 * | 3/2006 | Hosoda | 715/234 |
| 7,731,589 B2 * | 6/2010 | Kataoka et al. | 463/42 |
| 2002/0188673 A1 | 12/2002 | Grimson | |
| 2003/0076512 A1 | 4/2003 | Laughlin | |
| 2003/0221168 A1 | 11/2003 | Kozlov | |
| 2004/0039993 A1 | 2/2004 | Kougiouris et al. | |
| 2004/0073708 A1 | 4/2004 | Warnock | |
| 2005/0117886 A1 | 6/2005 | Kang et al. | |
| 2005/0154982 A1 | 7/2005 | Berg | |
| 2005/0268233 A1 | 12/2005 | Perla et al. | |
| 2006/0010374 A1 * | 1/2006 | Corrington et al. | 715/517 |

* cited by examiner

Primary Examiner — Chuck Kendall
(74) Attorney, Agent, or Firm — Yudell Isidore Ng Russell PLLC

(57) ABSTRACT

A method of formatting source code in an Integrated Development Environment (IDE) environment includes the steps of: selecting a source statement in an IDE; associating a style sheet definition with a selected source statement; applying the style sheet definition to the selected source statement to format a display of the selected source statement; and in response to the style sheet definition being applied to the selected source statement, displaying content from the selected source statement in a visual style that is defined by the style sheet definition.

18 Claims, 4 Drawing Sheets

OUTPUT STYLING IN AN IDE CONSOLE

BACKGROUND OF THE INVENTION

The present invention relates in general to the field of computers and other data processing systems, including hardware, software and processes. More particularly, the present invention pertains to a text output formatting system that uses pattern matching specified by a user to automatically apply HyperText Markup Language (HTML) tagging and Cascading Style Sheets (CSS) style definitions for rendering in a browser based Integrated Development Environment (IDE) console.

Today, most programmers use an IDE when developing new code, particularly when using an Object Oriented Language (such as Java™). The output of such code is presented in a console pane in the IDE Graphical User Interface (GUI). This presented code is then examined by the programmer in order to help debug the source code. A problem arises for the programmer who is trying to correlate source code in an editor pane with displayed content in a console pane. The most common method for making such correlations is to add some meaningless symbols, such as a row of stars, to be output to the console pane. For example, two commands (to print the meaningless symbols) may bracket a block of meaningful source code in the editor pane. When the browser-supported console reads the source code from the editor pane, it will print out (in the console) the meaningless symbols before and after the output of the block of meaningful source code. However, this system of inserting such non-substantive code is clumsy, error prone, and time consuming. Furthermore, by displaying all text in the console using a same style/font/appearance, it is difficult, if not impossible, for the programmer to determine which displayed text correlates with which source code.

SUMMARY OF THE INVENTION

The present invention provides an improved computer-implementable method, system and computer-usable medium for correlating source code in an editor pane and output displayed in a console. In one embodiment, the invention includes a method of formatting source code in an Integrated Development Environment (IDE) environment, wherein the method includes the steps of: selecting a source statement in an IDE; associating a style sheet definition with a selected source statement; applying the style sheet definition to the selected source statement to format a display of the selected source statement; and in response to the style sheet definition being applied to the selected source statement, displaying content from the selected source statement in a visual style that is defined by the style sheet definition.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
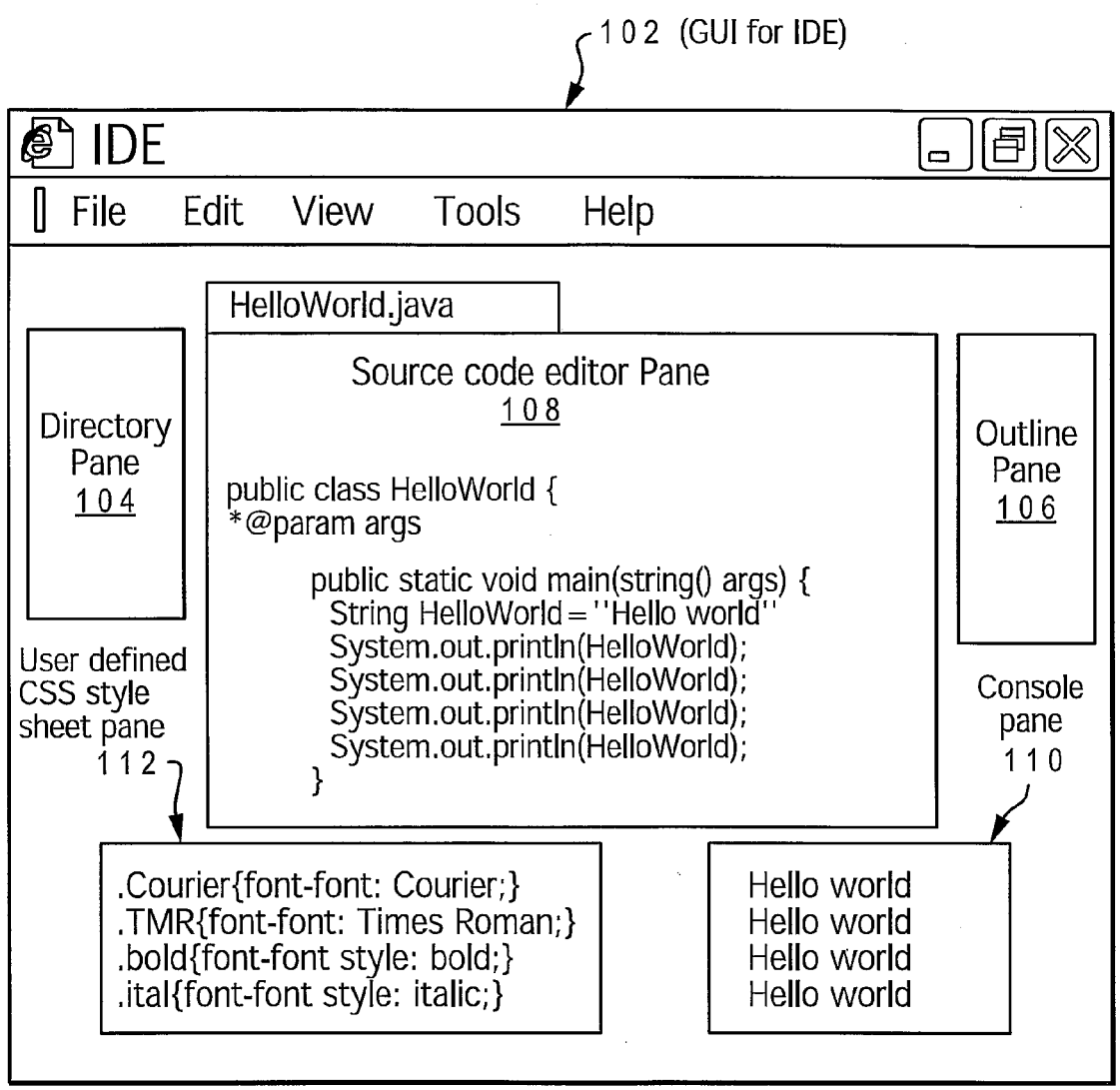
FIG. 1a depicts an exemplary Graphical User Interface (GUI) for a Integrated Development Environment (IDE) used in the present invention.

With reference now to the figures, and in particular to FIG. 1a, an exemplary Graphical User Interface (GUI) 102 for an Integrated Development Environment (IDE) is presented. As known to those skilled in the art of computer programming, an IDE is a type of computer software that aids computer program developers. The IDE may include a source code editor (which allows source code to be manually entered), a compiler and/or interpreter (for HyperText Markup Language—HTML based documents), build-automation tools, a debugger, directories of available libraries, an outline of a program being worked on, and a console for displaying source code output. Note that in the present invention, the console is browser-based, in order to take advantage of CSS and similar stylesheet languages to format the output of the source code.

Thus, as shown in FIG. 1a, the GUI 102 may include a directory pane 104 (for showing all packages that can be explored by the IDE), an outline pane 106 (showing an outline of code currently being developed or modified within the IDE), and a source code editor pane 108 (into which actual source code can be typed). Note that the source code entered into source code editor pane 108 is shown in exemplary manner as Java™ code. However, the console that supports a browser based pane 110 is able to associate Cascading Style Sheets (CSS) style definitions, shown in user defined CSS style sheet pane 112, with output (shown in source code editor pane 108) from the Java™ code.

As known to those skilled in the art, CSS is a stylesheet language that is used to describe a presentation of a document that is written in a markup language, such as HTML. Thus, CSS can style an output to be in a particular font (e.g., "courier"), font style (e.g., "bold"), color, size, etc. Similarly, HTML has a limited number of style descriptors, including "boldface" and other rudimentary descriptors. Again, these style descriptors can be applied to Java™ code, as contemplated in an exemplary manner in the present invention. Note that a Java™ programmer/developer using the present invention can output any image, text or non-text based, to the console in the IDE since the console is browser-based.

Figure 1B:
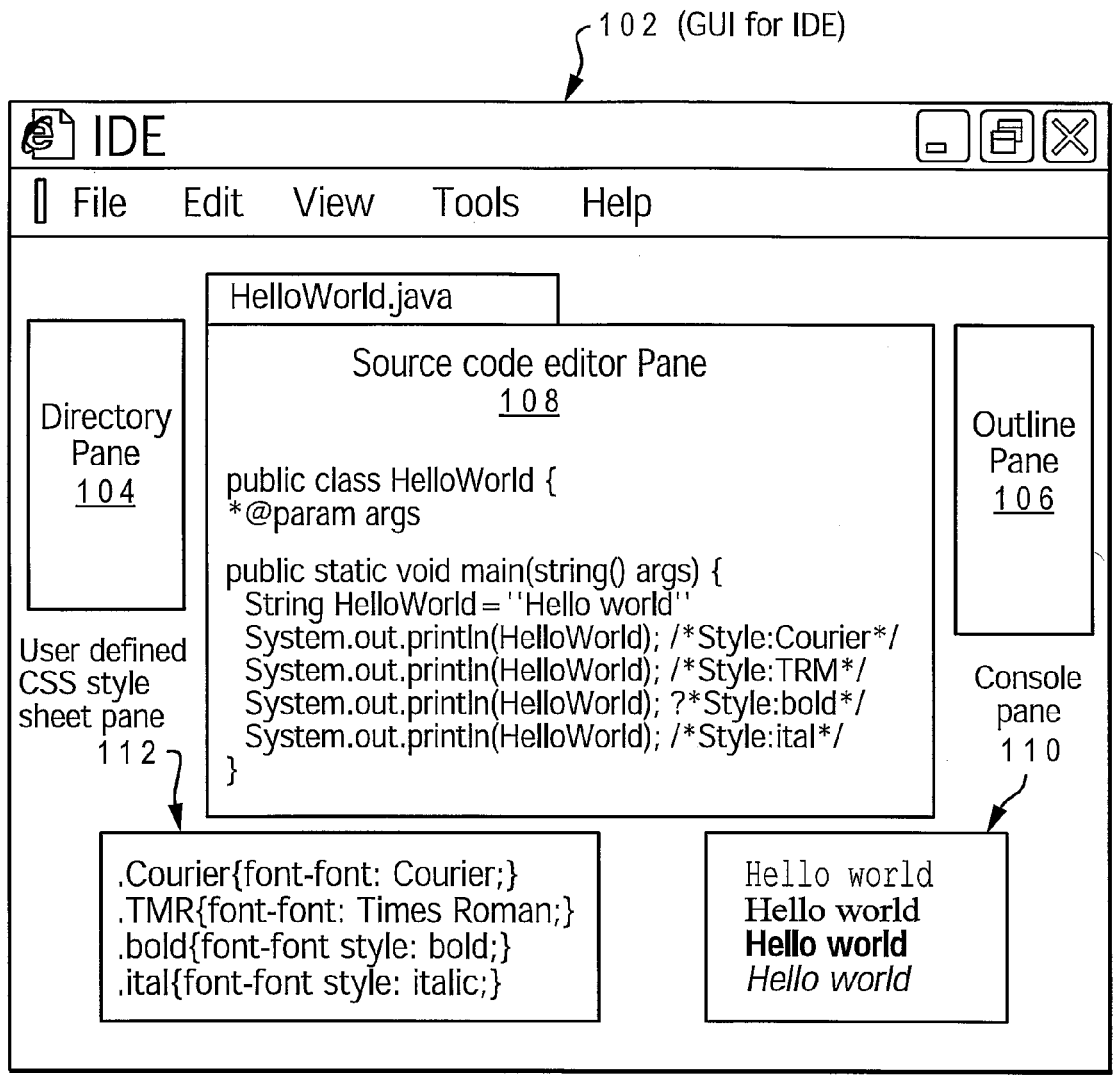
FIG. 1b illustrates the GUI in FIG. 1a, showing the results of using a style sheet pane to correlate source code (in an editor pane) with output (in a console pane)

Referring again to FIG. 1a, consider the output shown in console pane 110. Console pane 110 displays "Hello world" four times, all appearing exactly the same. Thus, there is no way to know (except perhaps by the order of the Java™ code) which "System.out.println" command is associated with a particular rendering of "Hello world." However, as shown in FIG. 1b, each "System.out.println" command is associated with a particular CSS style shown in CSS style sheet pane 112. As shown in the example, a first string of "Hello world" is in "courier" font, the second string uses "Times Roman," the third string is in bold print, and the fourth is in italics. Thus, the output shown in console pane 110 has four differently appearing renderings of "Hello world", such that it is easy for the programmer to known which line of source code is responsible for which rendering of the text "Hello world." Note that, in a preferred embodiment, the "Style:x" part of the lines are bracketed by slash-asterisks, indicating that they are not part of the hard code for the line, but rather are non-executable comments indicating that the output of the line will be formatted in a manner (e.g., using a CSS style sheet) shown. This allows the code to be run outside the IDE without disrupting the original code. That is, the output can be displayed on any computer without the styling described herein, since the styling described herein is primarily intended to allow the developer to correlate the source code with the output during development, and thus is used only during development time (in the IDE). Note also that other appearances may be the displayed content's color, size, dynamics (e.g., blinking or non-blinking), etc.

Figure 2:
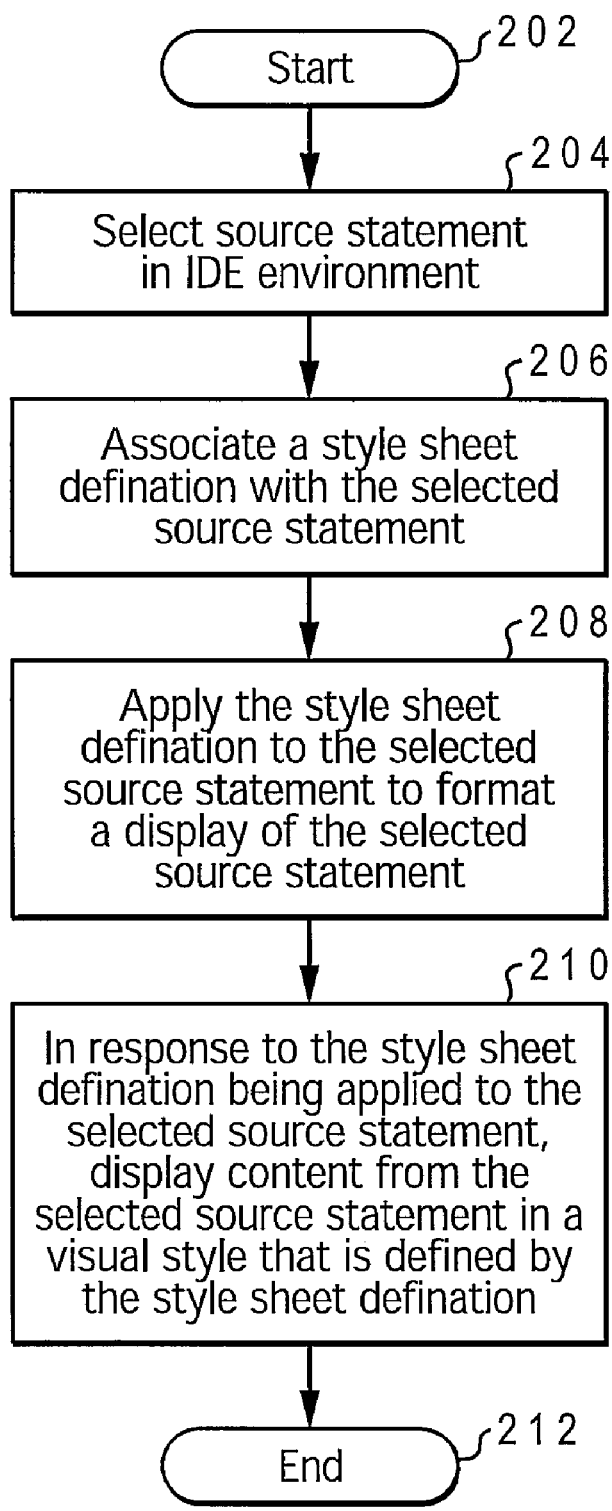
FIG. 2 is a flow-chart of exemplary steps taken by the present invention.

With reference now to FIG. 2, a flow-chart of exemplary steps taken in the present invention is presented. After initiator block 202, a source statement in source code editor pane 108 is selected. This selection may be via a "hovering" of a cursor near the source statement (such as one of the statements shown in FIG. 1b as "System.out.println (Hello World)"), which results in a pop-up window (not shown) appearing near the source statement. Within this pop-up window is a listing of available style definitions, such as those shown in user-defined CSS style sheet pane 112, that may be used to augment the appearance of content ("Hello world") from the source statement. Note that the CSS stylesheets are preferably user-defined. That is, a user can define and input a particular CSS stylesheet into CSS style sheet pane 112, which invokes underlying logic to place the input stylesheets into a referenced database (e.g., a table that is assigned to the user or a particular program). The user can define not only the style appearance for the stylesheet, but also the type of source code to which the stylesheet can be applied. The underlying logic (such as found in an Associative Styling Program (ASP) 348 described below) can also have the capability of allowing the user to delete stylesheets from CSS style sheet pane 112.

The user can then associate a selected style sheet definition with the selected source statement (block 206) by choosing one of the available style sheet definitions shown in the pop-up window, and then applying the style sheet definition (such as shown in the concatenated code shown in FIG. 1b) to the selected source statement to format a display of content ("Hello world") from the selected source statement (block 208). Alternatively, one of the CSS style statements may be dragged-and-dropped from CSS style sheet pane 112 to the appropriate source statement shown in source code editor pane 108, or else the CSS style statement can be typed into a concatenated code shown in FIG. 1b. Note that the content to be displayed may be formatted by matching the print statements (e.g., "System.out.println") with the user defined CSS styles (such as those shown in CSS style sheet pane 112) to produce user-unique HTML tags that are interpreted and displayed to the console pane 110 by a browser that is associated with and supports console pane 110. Thus, as described in block 210, content from the selected source statement is displayed in a visual style that is defined by the style sheet definition, and the process ends (terminator block 212).

Figure 3:
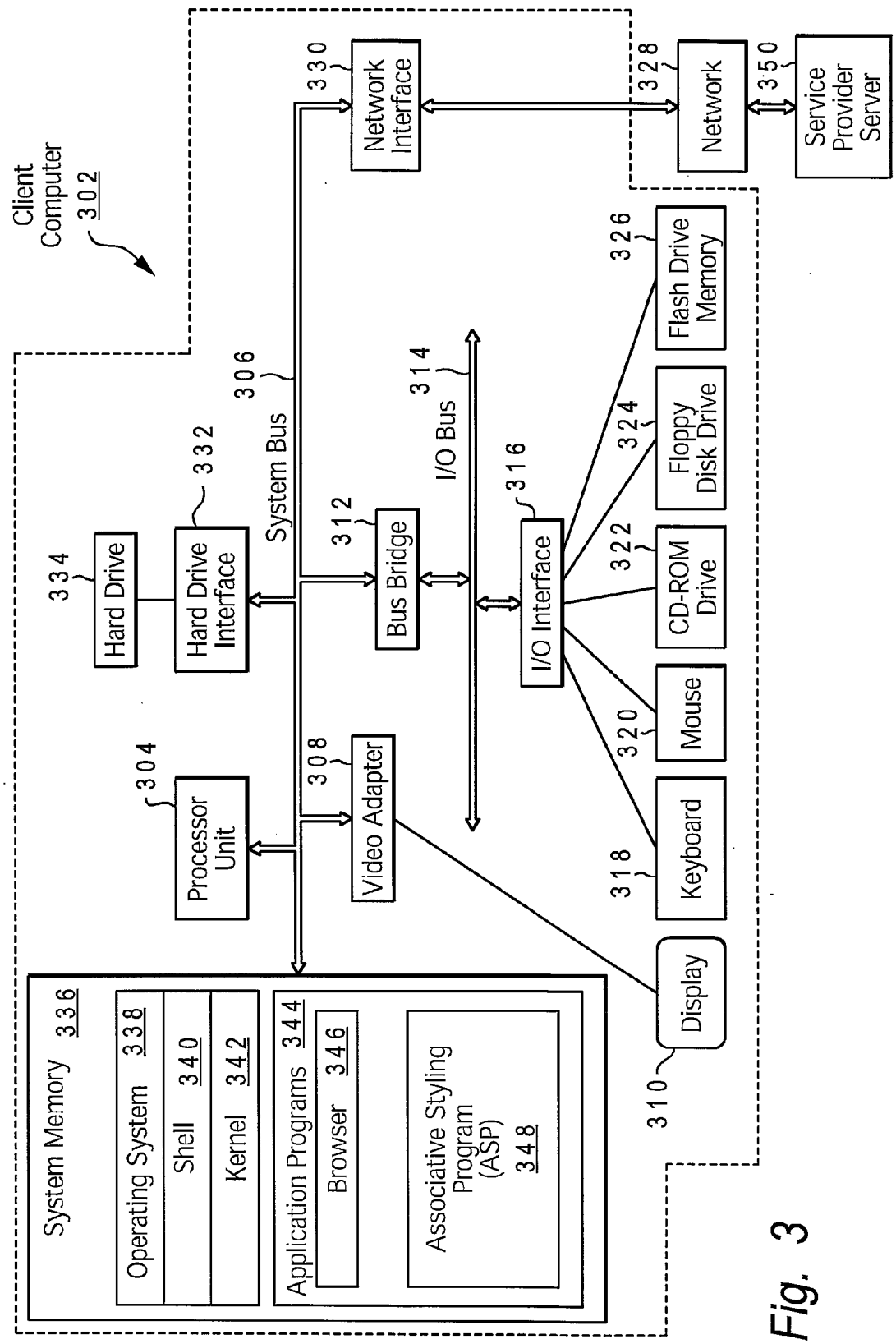
FIG. 3 depicts an exemplary computer in which the present invention may be implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 350 via a network 328 using a network interface 330, which is coupled to system bus 306. Network 328 may be an external network such as the Internet, or an internal network such as an Ethernet or a Virtual Private Network (VPN). Using network 328, client computer 302 is able to use the present invention to access service provider server 350.

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 350.

Application programs 344 in client computer 302's system memory also include an Associative Styling Program (ASP) 348, which includes code for implementing the processes described in FIGS. 1a-2. In one embodiment, client computer 302 is able to download ASP 348 from service provider server 350, which may utilize a similar architecture as shown in FIG. 3 for client computer 302.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

As described above, in one embodiment, the processes described by the present invention, including the functions of ASP 348, are performed by service provider server 350. Alternatively, ASP 348 and the method described herein, and in particular as shown and described in FIGS. 1a-2, can be deployed as a process software from service provider server 350 to client computer 302. Still more particularly, process software for the method so described may be deployed to service provider server 350 by another service provider server (not shown).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Note further that, as described above, instructions used in each embodiment of a computer-usable medium may be deployed from a service provider to a user. This deployment may be made in an "on-demand" basis as described herein.

The present invention thus presents a method, system, and computer-readable medium for formatting an output of source code in an Integrated Development Environment (IDE) environment. In one embodiment, the method includes the steps of: selecting a source statement in an IDE; associating a style sheet definition with a selected source statement; applying the style sheet definition to the selected source statement to format a display of the selected source statement; and in response to the style sheet definition being applied to the selected source statement, displaying content from the selected source statement in a visual style that is defined by the style sheet definition. The method may further include the steps of applying the style sheet definition in response to the selected source statement executing in the IDE; invoking a browser component of a console pane of the IDE; and visually presenting content, from the selected source statement, in the console pane. The method may automatically apply HyperText Markup Language (HTML) tagging and Cascading Style Sheets (CSS) style definitions as the style sheet definitions for the selected source statement. Furthermore, in one embodiment, the method may include the steps of in response to detecting a hovering of a cursor near the selected source statement displayed in a source code editor pane in the IDE environment, presenting a listing of style definitions that are available for the selected source statement; and in response to one of the style definitions in the listing being selected, displaying a line of style code next to a selected source statement, wherein the line of style code controls how content from the selected source statement appears in a console pane in the IDE environment. The selected source statement may control a display of a non-text based graphical display, and wherein the style sheet definition defines an appearance of the non-text based graphical display (e.g., borders, hyperlinks, pictures, tables, etc.) when the non-text based graphical display is displayed in a console pane in the IDE environment. In another embodiment, the method may further include the step of in response to detecting a mouse right-click when a cursor is positioned near the selected source statement displayed in a source code editor pane in the IDE environment, presenting a listing of style definitions that are available for the selected source statement.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of formatting an output of source code in an Integrated Development Environment (IDE), said method comprising:
  selecting a source statement within a source code in the IDE, wherein the source statement includes an executable hard-coding;
  associating a selected style sheet definition of one or more available style sheet definitions with the selected source statement;
  automatically applying the selected style sheet definition within non-executable comments in the selected source statement to format an output of the selected source statement within the IDE, wherein the non-executable comments are separate from the executable hard-coding of the selected source statement; and
  in response to applying the selected style sheet definition to the selected source statement:
    a processor invoking a browser component of a console pane in the IDE, and
    the processor displaying, only within the console pane of the IDE, the formatted output of the selected source statement in a visual style that is defined by the selected style sheet definition, wherein the formatted output of the selected source statement is only viewable within the IDE during development time, and wherein an output of the source statement outside of the IDE is not formatted in the visual style defined by the selected style sheet definition.

2. The method of claim 1, further comprising:
  applying the selected style sheet definition in response to an output of the selected source statement within the IDE.

3. The method of claim 1, wherein the selected style sheet definition includes one or more of a HyperText Markup Language (HTML) tagging and a Cascading Style Sheets (CSS) style definition.

4. The method of claim 1, further comprising:
  in response to detecting a hovering of a cursor near the selected source statement displayed within a source code editor pane in the IDE, presenting a listing of available style definitions for the selected source statement.

5. The method of claim 4, further comprising:
  in response to selection of one of the style definitions in the listing of available style definitions, displaying a line of style code next to a selected source statement, wherein the line of style code controls how content from the selected source statement appears within the console pane in the IDE.

6. The method of claim 1, wherein the selected source statement controls a display of a non-text based graphical display, and wherein the style sheet definition defines an appearance of the non-text based graphical display when the non-text based graphical display is displayed within the console pane in the IDE.

7. The method of claim 1, further comprising:
  in response to detecting a mouse right-click while a cursor is positioned near the selected source statement displayed within a source code editor pane in the IDE, presenting a listing of available style definitions for the selected source statement.

8. A system comprising:
a processor;
a data bus coupled to the processor;
a memory coupled to the data bus; and
a computer-usable medium embodying computer program code, the computer program code comprising instructions executable by the processor and configured to cause the system to:
select a source statement within a source code in an Integrated Development Environment (IDE), wherein the source statement includes an executable hard-coding;
associate a selected style sheet definition of one or more available style sheet definitions with the selected source statement;
automatically apply the selected style sheet definition within non-executable comments in the selected source statement to format an output of the selected source statement within the IDE, wherein the non-executable comments are separate from the executable hard-coding of the selected source statement; and
in response to applying the selected style sheet definition being applied to the selected source statement:
invoke a browser component of a console pane in the IDE, and
display, only within the console pane of the IDE, the formatted output of the selected source statement in a visual style that is defined by the selected style sheet definition, wherein the formatted output of the selected source statement is only viewable within the IDE during development time, and wherein an output of the source statement outside of the IDE is not formatted in the visual style defined by the selected style sheet definition.

9. The system of claim 8, wherein the instructions are further configured to cause the system to:
apply the selected style sheet definition in response to an output of the selected source statement within the IDE.

10. The system of claim 8, wherein the selected style sheet definition includes one or more of a HyperText Markup Language (HTML) tagging and a Cascading Style Sheets (CSS) style definition.

11. The system of claim 8, wherein the instructions are further configured to cause the system to:
in response to detecting a hovering of a cursor near the selected source statement displayed within a source code editor pane in the IDE, present a listing of available style definitions for the selected source statement.

12. The system of claim 11, wherein the instructions are further configured to cause the system to:
in response to selection of one of the style definitions in the listing of available style definitions, display a line of style code next to a selected source statement, wherein the line of style code controls how content from the selected source statement appears within the console pane in the IDE.

13. The system of claim 8, wherein the selected source statement controls a display of a non-text based graphical display, and wherein the style sheet definition defines an appearance of the non-text based graphical display when the non-text based graphical display is displayed within the console pane in the IDE.

14. The system of claim 8, wherein the instructions are further configured to cause the system to:
in response to detecting a mouse right-click while a cursor is positioned near the selected source statement displayed within a source code editor pane in the IDE, present a listing of available style definitions for the selected source statement.

15. A computer-usable storage medium embodying computer program code, the computer program code comprising computer executable instructions configured for:
selecting a source statement within a source code in an Integrated Development Environment (IDE), wherein the source statement includes an executable hard-coding;
associating a selected style sheet definition of one or more available style sheet definitions with the selected source statement;
automatically applying the selected style sheet definition within non-executable comments in the selected source statement to format an output of the selected source statement within the IDE, wherein the non-executable comments are separate from the executable hard-coding of the selected source statement; and
in response to applying the selected style sheet definition being applied to the selected source statement:
invoking a browser component of a console pane in the IDE, and
displaying, only within the console pane of the IDE, the formatted output of the selected source statement in a visual style that is defined by the selected style sheet definition, wherein the formatted output of the selected source statement is only viewable within the IDE during development time, and wherein an output of the source statement outside of the IDE is not formatted in the visual style defined by the selected style sheet definition.

16. The computer-usable storage medium of claim 15, wherein the computer executable instructions are further configured for performing one or more of:
applying the selected style sheet definition in response to an output of the selected source statement within the IDE;
in response to selection of one of the style definitions in the listing of available style definitions, displaying a line of style code next to a selected source statement, wherein the line of style code controls how content from the selected source statement appears within the console pane in the IDE; and
in response to detecting a mouse right-click while a cursor is positioned near the selected source statement displayed within a source code editor pane in the IDE, presenting a listing of IDE style definitions for the selected source statement.

17. The computer-useable storage medium of claim 15, wherein the computer executable instructions are deployable to a client computer from a server at a remote location.

18. The computer-useable storage medium of claim 15, wherein:
the computer executable instructions are provided by a service provider to a customer on an on-demand basis, and
the selected style sheet definition includes one or more of a HyperText Markup Language (HTML) tagging and a Cascading Style Sheets (CSS) style definition.

* * * * *